United States Patent
Murthy et al.

(10) Patent No.: US 12,007,847 B2
(45) Date of Patent: Jun. 11, 2024

(54) REPORTING FOR DATABASE BACKUPS (71) Applicant: EMC IP Holding Company LLC, Hopkinton, MA (US)

(72) Inventors: Rachana Murthy, Bangalore (IN); Shelesh Chopra, Bangalore (IN); Ban Wang, Ontario (CA); Hari Palani, Bangalore (IN); Amith Ramachandran, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 154 days.

(21) Appl. No.: 17/236,079

(22) Filed: Apr. 21, 2021

(65) Prior Publication Data
US 2022/0342768 A1 Oct. 27, 2022

(51) Int. Cl.
*G06F 11/14* (2006.01)
*G06F 11/30* (2006.01)

(52) U.S. Cl.
CPC ...... *G06F 11/1464* (2013.01); *G06F 11/1451* (2013.01); *G06F 11/1461* (2013.01); *G06F 11/1469* (2013.01); *G06F 11/3072* (2013.01); *G06F 2201/80* (2013.01)

(58) Field of Classification Search
CPC ............ G06F 11/1464; G06F 11/1451; G06F 11/1461; G06F 11/1469; G06F 11/3072; G06F 2201/80
See application file for complete search history.

(56) References Cited

U.S. PATENT DOCUMENTS

| | | | |
|---|---|---|---|
| 9,600,487 B1 * | 3/2017 | Pandian | G06F 11/1466 |
| 9,971,529 B1 * | 5/2018 | LeCrone | G06F 3/067 |
| 2006/0047929 A1 * | 3/2006 | Otani | G06F 3/0623 |
| | | | 711/162 |
| 2008/0022281 A1 * | 1/2008 | Dubhashi | G06F 9/547 |
| | | | 718/102 |
| 2016/0248676 A1 * | 8/2016 | Thanasekaran | G06F 3/0613 |
| 2020/0042395 A1 * | 2/2020 | Chu | G06F 16/24552 |
| 2020/0242592 A1 * | 7/2020 | Scrivner | G06Q 20/3672 |

FOREIGN PATENT DOCUMENTS

JP    2015057685 A   *   3/2015

* cited by examiner

*Primary Examiner* — Mark D Featherstone
*Assistant Examiner* — Tony Wu
(74) *Attorney, Agent, or Firm* — Chamberlain, Hrdlicka, White, Williams & Aughtry; Aly Z. Dossa (57) ABSTRACT

Techniques described herein relate to a method for reporting database backup information. The method may include starting a monitor process; generating a flag file for the database backup comprising a parent process identifier (PID) of a parent process of a first child process; associating a second child process with the monitor process by identifying the flag file using the parent PID; receiving channel close alerts from the child processes; making a first determination that backup jobs performed in a first channel were successful; making a second determination that backup jobs performed in the second channel were successful; and transmitting, based on the first determination and the second determination, a backup success report to a backup coordinator.

17 Claims, 6 Drawing Sheets

REPORTING FOR DATABASE BACKUPS

BACKGROUND

Computing devices often exist in environments in which databases may need to be backed up from time to time. In such environments, it is often useful for one or more entities to be made aware of when backups happen, as well as the success or failure of the backups. However, certain backup schemes using particular reporting systems may have no way of collating each portion of a backup to determine the overall success or failure of the backup.

SUMMARY

In general, certain embodiments described herein relate to a method for reporting database backup information. The method may include starting, by a first library instance of a first child process executing on a data source device, a monitor process, wherein the first child process comprises a first backup channel for performing a first portion of a database backup; generating, by the monitor process, a flag file for the database backup comprising a parent process identifier (PID) of a parent process of the first child process; associating a second child process with the monitor process by identifying the flag file using the parent PID, wherein the second child process comprises a second backup channel for performing a second portion of the database backup; receiving, by the monitor process, a first channel close alert corresponding to the first channel from the first child process; receiving, by the monitor process, a second channel close alert corresponding to the second channel from the second child process; making a first determination, by the monitor process, that a first plurality of backup jobs performed in the first channel were successful; making a second determination, by the monitor process, that a second plurality of backup jobs performed in the second channel were successful; and transmitting, by the monitor process and based on the first determination and the second determination, a backup success report to a backup coordinator.

In general, certain embodiments described herein relate to a non-transitory computer readable medium that includes computer readable program code, which when executed by a computer processor enables the computer processor to perform a method for reporting database backup information. The method may include starting, by a first library instance of a first child process executing on a data source device, a monitor process, wherein the first child process comprises a first backup channel for performing a first portion of a database backup; generating, by the monitor process, a flag file for the database backup comprising a parent process identifier (PID) of a parent process of the first child process; associating a second child process with the monitor process by identifying the flag file using the parent PID, wherein the second child process comprises a second backup channel for performing a second portion of the database backup; receiving, by the monitor process, a first channel close alert corresponding to the first channel from the first child process; receiving, by the monitor process, a second channel close alert corresponding to the second channel from the second child process; making a first determination, by the monitor process, that a first plurality of backup jobs performed in the first channel were successful; making a second determination, by the monitor process, that a second plurality of backup jobs performed in the second channel were successful; and transmitting, by the monitor process and based on the first determination and the second determination, a backup success report to a backup coordinator.

In general, certain embodiments described herein relate to a system for reporting database backup information. The system may include a data source device operatively connected to a backup coordinator. The data source device may include a processor; memory; a storage device; and a first library instance of a first child process executing on the processor and including a first backup channel for performing a first portion of a database backup. The first library instance may be configured to start a monitor process. The data source device may also include the monitor process, executing on the processor, and configured to: generate a flag file for the database backup comprising a parent process identifier (PID) of a parent process of the first child process; associate a second child process with the monitor process by identifying the flag file using the parent PID, wherein the second child process comprises a second backup channel for performing a second portion of the database backup; receive a first channel close alert corresponding to the first channel from the first child process;

receive a second channel close alert corresponding to the second channel from the second child process; make a first determination that a first plurality of backup jobs performed in the first channel were successful; make a second determination that a second plurality of backup jobs performed in the second channel were successful; and transmit, based on the first determination and the second determination, a backup success report to the backup coordinator.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures.

In the below description, numerous details are set forth as examples of embodiments described herein. It will be understood by those skilled in the art, that have the benefit of this Detailed Description, that one or more embodiments of the embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments described herein relate to methods, systems, and non-transitory computer readable mediums storing instructions for providing backup status updates to status information recipient devices when database backups are performed. Specifically, when a database backup is initiated, the actual backup may be performed as any number of discrete backup jobs, in any number of parallel backup channels. Often, however, the channels are not aware of each other's existence. Thus, reporting the overall success or failure of the backup may not be possible. Embodiments described herein address this problem using a scheme by which a monitor process is started on a data source device that tracks all backup jobs in all backup channels that correspond to child processes having the same parent process identifier (parent PID) for a given backup of a database.

In one or more embodiments, when a backup of a database (e.g., an Oracle® database) is initiated using a command line interface (CLI) (e.g., Oracle Recovery Manager (RMAN)), a child process is created. In one or more embodiments, if the database being backed up is on the same local device as the CLI being used to initiate the backup, the child process is on that same device. In one or more embodiments, if the database being backed up is remote to the CLI from which the backup is initiated, the CLI process interacts with an agent on the remote device to start the child process on the remote device.

In one or more embodiments, the child process has a parent PID that corresponds to the PID of the CLI instance used to initiate the backup, or of the agent with which the CLI instance interacted to initiate the backup. In one or more embodiments, the child process calls a library instance in order to have a library for interacting with a particular remote backup coordinator (e.g., Dell EMC® NetWorker).

In one or more embodiments, the child process includes a channel that receives a portion of the data for a database backup, and transmits the data either to a backup coordinator for further transmission to one or more backup target devices, or directly to one or more backup target devices that have been prepared by the backup coordinator. In order for a database backup to be performed, any number of child processes may be created, thereby using any number of backup channels. Using multiple backup channels may, for example, improve backup performance due to different portions of the database being backed up in parallel.

During the course of a database backup, each channel being used for the backup may perform any number of backup jobs. For example, a given backup may start ten different child processes, each having a backup channel, and the backup may be divided into 100 separate backup jobs, each backing up a different portion of the data of a database. In such a scenario, each channel may be used for ten separate backup jobs to facilitate the 100 backup jobs of the backup.

Embodiments described herein provide the capability to report the success or failure of the backup to the backup coordinator, which may, in turn, report the success or failure, along with other relevant information, to a backup status information recipient device (e.g., a Simple Network Management Protocol (SNMP) trap receiver).

In one or more embodiments, in order to report the success or failure of the backup as a whole, the success or failure of each backup job in each channel must be ascertained. In one or more embodiments, success or failure of the backup jobs of a backup is determined by a monitor process that is started to monitor and report on the backup. In one or more embodiments, the first child process that is created for a given backup calls a library that includes functionality to facilitate interaction with a remote backup coordinator. In one or more embodiments, the library is provided with a backup job name. In one or more embodiments, the library provides a possible backup job name to the remote backup coordinator, which performs a check to determine if the name is unique. If the name is not unique, another name may be provided, and another such check performed. Once a unique name has been identified, the backup job may proceed. In one or more embodiments, the backup job name check is performed for each backup job of the backup, and each name must be determined to be unique for the backup job to proceed.

In one or more embodiments, the library of the child process having the channel in which the backup job is to be performed performs a check to determine if a monitor process already exists for the backup by checking to see if a flag file exists in storage (or memory) of the data source device (i.e., the device(s) on which the database is stored). In one or more embodiments, a flag file is a file created by a backup monitor process, that includes, at least, the parent PID of the CLI instance (or corresponding agent) that created the child process, as well as various items of information about the backup jobs of the backup (e.g., child PIDs, backup job start times, backup job end times, backup job successes or failures, etc.).

In one or more embodiments, if a flag file with a parent PID that is the same of the parent PID of a child process performing the check already exists, then a monitor process for the backup already exists, and the library called by the child process does not need to start a monitor process, but instead will report information to the existing monitor process. In one or more embodiments, if there is no such flag file, the library starts a monitor process.

In one or more embodiments, the monitor process then checks for a flag file with the parent PID. In one or more embodiments, this additional check for a flag file is performed because multiple child processes for a given backup may be started at similar times, and the first flag file check that any number of the child processes perform may yield that no monitor process yet exists. Accordingly, any number of library instances in any number of child processes of a given backup may start a monitor process. However, only one of the monitor process instances will be the first to create a flag file for use when monitoring the backup. In one or more embodiments, if there is no flag file yet, a monitor process creates one that has the parent PID of the child process that created the monitor process. In one or more embodiments, if a started monitor service determines that a flag file with the relevant parent PID already exists when it attempts to create a flag file, that instance of the monitor process ends, as another monitor process for the backup necessarily already exists (because it created the flag file).

In one or more embodiments, once the monitor process for the backup has been started, each child process, with each channel for the backup, uses its library instance to report to the monitor process information that may include, but is not limited to, when a backup job starts, the name of the backup job, and when the backup job ends in success or ends in a failure that is not a result of the failure of the child process as a whole. In one or more embodiments, such reporting occurs from each child process with the same parent PID for all backup jobs performed in the various channels of such child processes. In one or more embodiments, the various child processes also report when the channel of that child process closes, meaning all backup jobs to be performed in that particular channel have completed.

In one or more embodiments, once the monitor process receives an alert that a channel has closed, the monitor process determines if all other channels have already been reported as closed. In one or more embodiments, if all other channels have been closed, then the backup is complete, and the monitor process transmits a report about the backup to the backup coordinator. In one or more embodiments, the report includes the backup start time (e.g., the time at which the first backup job of the backup started), the backup finish time (e.g., the time the last channel closed), and the overall success or failure of the backup. In one or more embodiments, if any backup job of the backup failed, the entire backup is reported as a failure. In one or more embodiments, if all backup jobs of the backup completed successfully, the backup is reported as a success.

In one or more embodiments, if the monitor process receives an alert from a child process that its channel has closed, and the monitor process determines that all other channels have not yet been reported as closed, the monitor process then performs a check to determine if the PIDs of the child processes are still active (i.e., the child process is still executing). In one or more embodiments, the monitor process checks with the process manager of the operating system to determine if the child process is still executing. In one or more embodiments, if all child processes that have not reported their channel being closed are still executing, the monitor process continues to monitor the backup and wait for additional alerts when the remaining channels close. In one or more embodiments, if a channel has not yet been reported as closed, and the check on the child PID for the child process having the channel indicates that the child process is no longer executing, then the monitor process knows that the child process failed, and, thus, the backup has failed. In one or more embodiments, the monitor process then reports the failure of the backup to the backup coordinator.

In one or more embodiments, once the backup coordinator receives a report corresponding to a backup from the monitor process executing on the data source device, the backup coordinator transforms the report into an appropriate format (e.g., an SNMP trap), and sends the formatted result to a backup status information recipient device (e.g., an SNMP trap receiver)

Figure 1A:
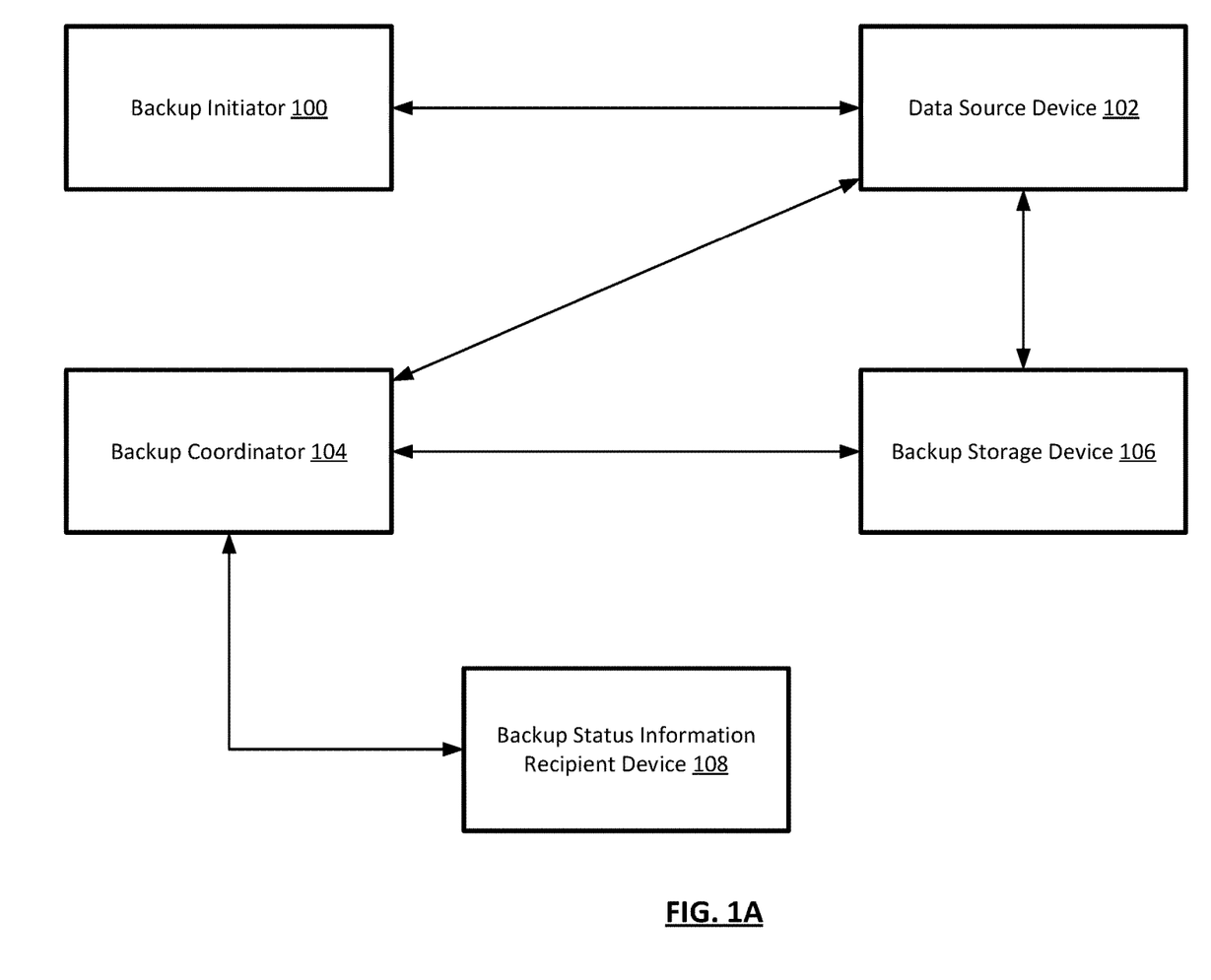
FIG. 1A shows a diagram of a system in accordance with one or more embodiments of the invention.

FIG. 1A shows a diagram of a system in accordance with one or more embodiments described herein. The system may include backup initiator (100), data source device (102), backup coordinator (104), backup storage device (106), and backup status information recipient device (108). Each of these components is described below.

In one or more embodiments, backup initiator (100) is software, hardware (e.g., circuitry), firmware, or any combination thereof that includes functionality to initiate a backup of a database. For example, backup initiator may be a CLI that allows a user to initiate a backup of a database. Such a backup may be started immediately, or may be scheduled for one or more future times at which backup initiator (100) will start a backup of a database. One example of a backup initiator is Oracle® RMAN. Other backup initiators may be used without departing from the scope of embodiments described herein.

In one or more embodiments, backup initiator (100) executes on a computing device. In one or more embodiments, a computing device is any device, portion of a device, or any set of devices capable of electronically processing instructions and may include any number of components, which include, but are not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a virtual machine, a logical container (e.g., for one or more applications), and/or any other type of computing device with the aforementioned requirements. Other types of computing devices may be used without departing from the scope of the embodiments described herein.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as a non-transitory computer readable medium, which may store software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, such as the example embodiment shown in FIG. 1, backup initiator (100) is part of a computing device that is separate from data source device (102). In such embodiments, backup initiator (100) interacts with one or more agents executing on data source device (102) to initiate a backup of a database. In other embodiments, backup initiator (100) executes on the data source device (102).

As described above, backup initiator (100) is operatively connected to, or executing on, data source device (102). In one or more embodiments, data source device (102) is a computing device (described above). In one or more embodiments, data source device (102) includes a database (not shown). One example of such a database is an Oracle® database. Other types of databases may be used without departing from scope of embodiments described herein.

In one or more embodiments, data source device (102) stores and executes a database and related functionality, and also includes functionality to execute any number of child processes for performing backup jobs of backups of the database, which may be started by backup initiator (100) or an agent associated with backup initiator (100) and executing on data source device (102). Data source device (102) is discussed further in the description of FIG. 1B, below.

In one or more embodiments, data source device (102) is operatively connected to backup coordinator (104). In one or more embodiments, backup coordinator (104) is a computing device (described above). In one or more embodiments, backup coordinator (104) includes functionality to coordinate and facilitate backup of databases such as a database of data source device (102). One example of a backup coordinator is Dell EMC® Networker. Other backup coordinators may be used without departing from the scope of embodiments described herein.

In one or more embodiments, backup coordinator (104) includes functionality to receive backup job data from channels of child processes executing on data source device (102), and to transmit the data to one or more target backup storage devices (e.g., backup storage device (106)). In one or more embodiments, backup coordinator (104) includes functionality to prepare target backup storage devices to receive transmission of backup job data directly from an operative connection between data source device (102) and the one or more backup storage devices. In one or more embodiments, backup coordinator (104) includes and/or functions as a backup status agent (e.g., an SNMP agent). As such, in one or more embodiments, backup coordinator (104) includes functionality to receive backup status information from a monitor process executing on data source device (102), convert the backup status information into an appropriate format (e.g., an SNMP format), and transmit the properly formatted backup status information to a backup status information recipient device (108).

In one or more embodiments, data source device (102) and backup coordinator (104) are operatively connected to backup storage device (106). In one or more embodiments, backup storage device (106) includes a data repository. In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location. Backup storage device (106) may include or be operatively connected to any number of computing devices. In one or more embodiments, backup storage device (106) includes functionality to store any type of data as a backup, such as, for example, a database of data source device (102).

In one or more embodiments, backup coordinator (104) is operatively connected to backup status information recipient device (108). In one or more embodiments, backup status information recipient device (108) is a computing device (described above). In one or more embodiments, backup status information recipient device (108) includes functionality to receive backup status information from backup coordinator (104), which may then be viewed by an entity of any type (e.g., an end user, monitoring software, etc.). One example of a backup status information recipient device (108) is an SNMP trap receiver. Other backup status information recipient devices may be used without departing from the scope of embodiments described herein.

In one or more embodiments, backup initiator (100), data source device (102), backup coordinator (104), backup storage device (106), and backup status information recipient device (108) are operatively connected via a network (not shown). A network may refer to an entire network or any portion thereof (e.g., a logical portion of the devices within a topology of devices). A network may include a data center network, a wide area network, a local area network, a wireless network, a cellular phone network, or any other suitable network that facilitates the exchange of information from one part of the network to another. A network may be located at a single physical location, or be distributed at any number of physical sites. In one or more embodiments, a network may be coupled with or overlap, at least in part, with the Internet.

While FIG. 1A shows a configuration of components, other configurations may be used without departing from the scope of embodiments described herein. For example, a backup initiator may execute on a data source device. As another example, there may be any number of backup initiators, data source devices, backup coordinators, backup storage devices and/or backup status information recipient devices. Accordingly, embodiments disclosed herein should not be limited to the configuration of components shown in FIG. 1A.

Figure 1B:
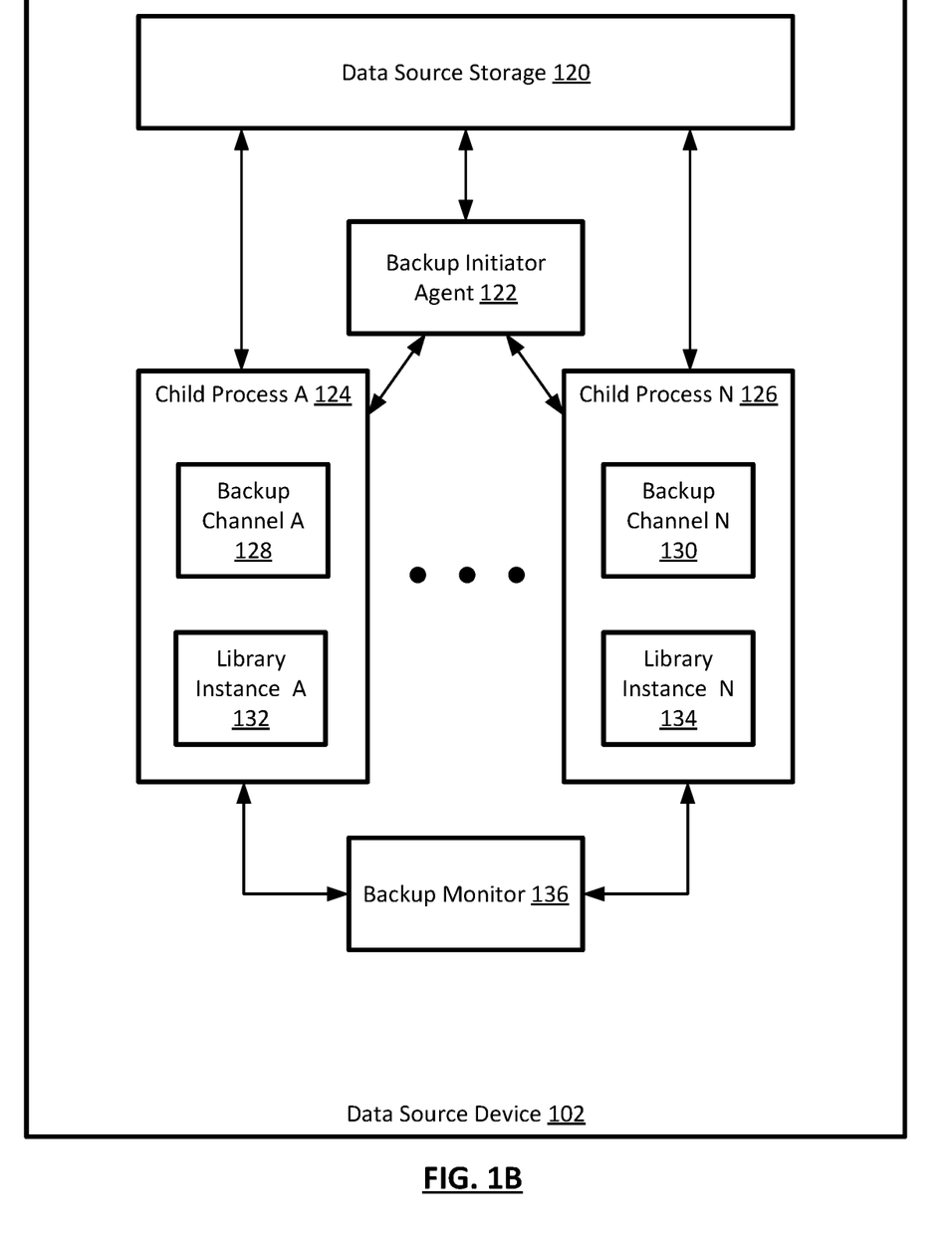
FIG. 1B shows a diagram of a data source device in accordance with one or more embodiments of the invention.

FIG. 1B shows a diagram of data source device (102) in accordance with one or more embodiments described herein. Data source device (102) may include data source storage (120), backup initiator agent (122) backup monitor (136), and any number of child processes (e.g., child process A (124), child process N (126)). Each child process (124, 126) may include a backup channel (e.g., backup channel A (128), backup channel N (130)) and a library instance (e.g., library instance A (132), library instance N (134)). Each of these components is described below.

In one or more embodiments, the data source device (102), as discussed above in the description of FIG. 1A, is a computing device, or portion thereof, which includes functionality to store and execute a database. In one or more embodiments, such a database may be stored in data source storage (120), which may be any type of storage medium suitable for storing data of a database, and any other information relevant to storing or performing backups of a database.

In one or more embodiments, data source device (102) includes backup initiator agent (122). In one or more embodiments, backup initiator agent (122) is any software, hardware (e.g., circuitry), firmware, or any combination thereof that includes functionality to initiate backup. In one or more embodiments, backup initiator (100) is operatively connected to a backup initiator (e.g., backup initiator (100) of FIG. 1A). In one or more embodiments, although not shown in FIG. 1B, a backup initiator may be executing on data source device (102), in which case there may not be a backup initiator agent, as backups would instead be initiated by the backup initiator directly. In one or more embodiments, backup initiator agent (122) (or a backup initiator executing on the data source device) includes functionality to start any number of child processes (e.g., 124, 126). As such, in one or more embodiments, backup initiator agent (or a backup initiator) is the parent process of the child processes that perform backups.

In one or more embodiments, child processes (124, 126) are processes started by backup initiator agent (122) (or by a backup initiator) in order to perform a backup of a database stored in data source storage (120) of data source device (102). In one or more embodiments, the child processes (124, 126) have different child PIDs, and each share the same parent PID (i.e., the PID of the backup initiator agent or backup initiator). In one or more embodiments, each child process includes a backup channel (128, 130). In one or more embodiments, a backup channel is a construct that includes functionality to receive data of a database from data source storage (120), and to transmit the data towards a backup storage device. In one or more embodiments, a backup channel (128, 130) serves as a data stream for backing up a database. Any one or more backup jobs, each backing up a portion of a database, may execute within a given backup channel Any number of such backup jobs, in any number of such backup channels, may collectively be used to back up a database.

In one or more embodiments, each child process (124, 126) includes a library instance (132, 134). In one or more embodiments, a library instance (132, 134) is an instance of a software library loaded by the child process to facilitate, at least in part, performing backup jobs. In one or more embodiments, a library is any collection of files, scripts, routines, commands, functions, data, objects, modules etc. that may be used to perform any number of actions or tasks on a computing device, and may be loaded by a process, such as a child process (124, 126) for performing certain functionality. The library instances (132, 134) may include functionality to communicate with a backup coordinator to, for example, check whether a name for a backup job is unique. The library instances (132, 134) may also include functionality to start, or attempt to start, a monitor process for monitoring a backup.

In one or more embodiments, each child process (124, 126) is operatively connected to a backup monitor (136). In one or more embodiments, a backup monitor is any software, hardware (e.g., circuitry), firmware, or any combination thereof, for monitoring backup jobs performed in channels of child processes for a given backup of a database. In one or more embodiments, backup monitor (136) is a monitor process started by at least one child process that includes functionality to monitor all child processes for a given backup, and all backup jobs performed using the backup channels in the child processes. The functionality of a backup monitor is discussed further in the descriptions of FIGS. 2A-2C, below.

While FIG. 1B shows a configuration of components, other configurations may be used without departing from the scope of embodiments described herein. Accordingly, embodiments disclosed herein should not be limited to the configuration of components shown in FIG. 1B.

Figure 2A:
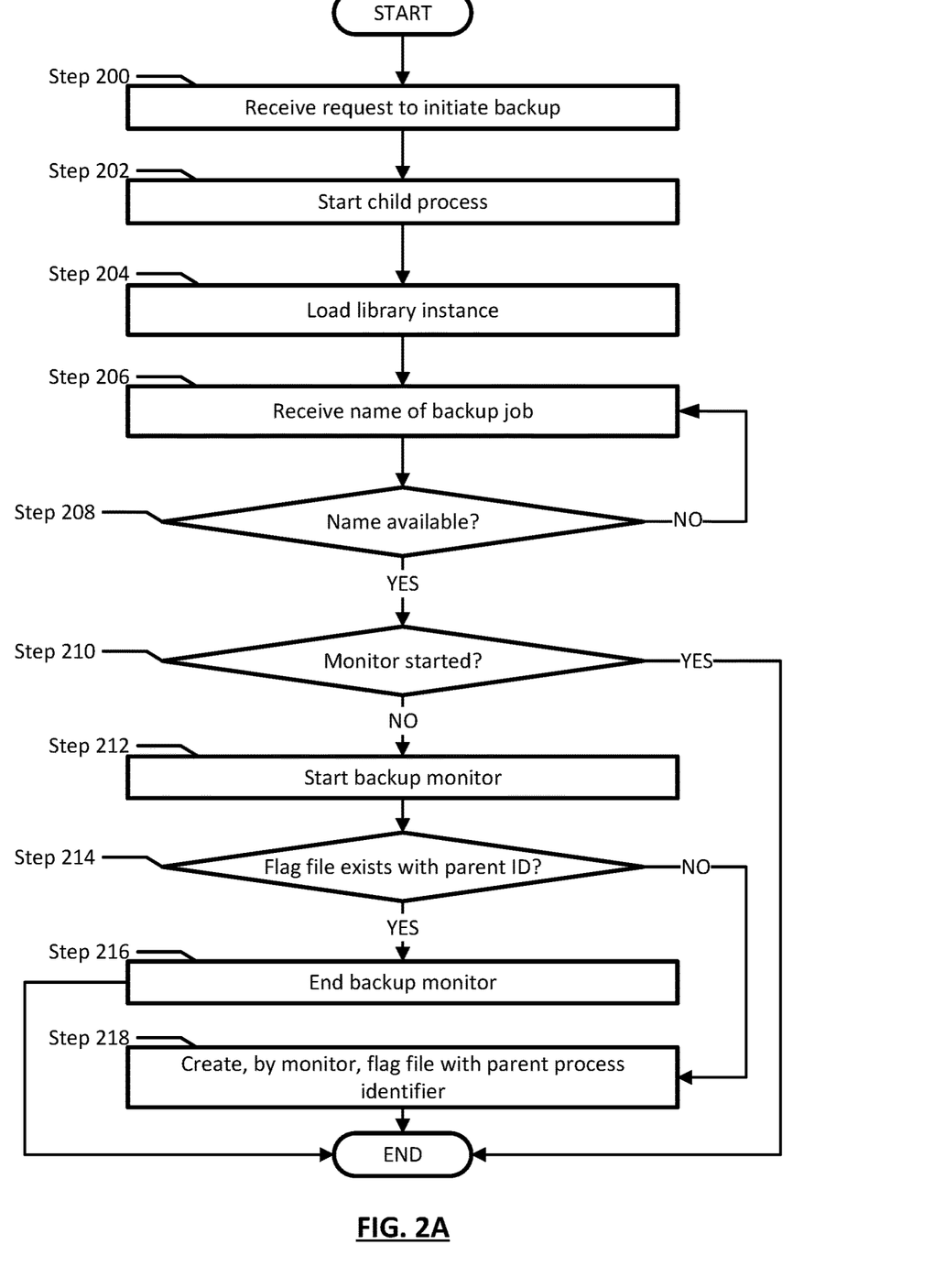
FIG. 2A shows a flowchart in accordance with one or more embodiments of the invention.

FIG. 2A shows a flowchart describing a method starting a monitor process in accordance with one or more embodiments disclosed herein.

While the various steps in the flowchart shown in FIG. 2A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, a request to initiate a backup is received. In one or more embodiments, the request is received via a CLI from an entity seeking to initiate a backup. In one or more embodiments, the request is received as part of a scheduled backup. In one or more embodiments, the request is received by an agent operatively connected to a backup initiator and executing on a data source device storing a database to be backed up. In one or more embodiments, the request is received by a backup initiator executing on such a data source device.

In Step 202, in response to the request received in Step 200, the backup initiator agent, or backup initiator, starts a child process, which will perform at least a portion of the backup jobs of the backup. Each backup job of a backup backs up a portion of the data of a database, and, collectively, all backup jobs back up the database, or any portion thereof, for which a backup is to be performed. In one or more embodiments, the child process has an associated child PID, as well as a parent PID. In one or more embodiments, the parent PID is the PID of the backup initiator, of backup initiator agent, that started the child process. In one or more embodiments, starting the monitor process includes the parent process (i. e., the backup initiator or backup initiator agent) making a system call to the operating system to start the child process.

In Step 204, the child process loads a library instance. In one or more embodiments, the library instance is loaded, in part, to facilitate performance of the backup jobs that will be performed by the child process using a backup channel of the child process.

In Step 206, the library instance loaded in Step 204 receives a potential name of a backup job that is to be performed in a backup channel of the child process. In one or more embodiments, the name can be any name pursuant to any naming scheme for naming backup jobs.

In Step 208, a determination is made as to whether the name received in Step 206 is available. In one or more embodiments, the determination is made by the library instance transmitting the name to a backup coordinator. In one or more embodiments, the backup coordinator performs a check to determine whether the proposed backup name is unique within the backup environment in which the database is being backed up. In one or more embodiments, a name of a backup job is required to be a unique name for a backup job of a database backup to be performed. In one or more embodiments, if a determination is made that the name received in Step 206 is not unique, the method returns to Step 206, and another name for the backup job is received. In one or more embodiments, if a determination is made that the name is unique, then the method proceeds to Step 210.

In Step 210, a determination is made as to whether a monitor process for the backup of which the backup job is a part has already been started. In one or more embodiments, the determination is made by the child process using the library instance to check if a flag file created by a monitor process and having the parent PID of the backup initiator or backup initiator agent already exists in a storage location of the data source device. In one or more embodiments, if such a flag file exists, then a monitor process for the backup already exists. In one or more embodiments, if a monitor process for the backup already exists, the method ends, and the child process will report backup job and channel information to the existing monitor process. In one or more embodiments, if no flag file exists, then the method proceeds to Step 212.

In Step 212, based on the determination of Step 210 that no monitor process has been started, the library instance of the child process starts a monitor process for the backup.

In Step 214, the monitor process started in Step 212 makes a determination as to whether a flag file exists for the backup. In one or more embodiments, the determination is made by checking whether a flag file having the parent PID exists in a defined location for such a file. In one or more embodiments, a chance exists that child processes for a given backup were started at times that were the same or close to one another. As such, the determination made in Step 210 for more than one such child process may have yielded that no monitor process had been started. Each such child process may then have started a monitor process. However, in one or more embodiments, only one monitor process will be the first to create the flag file for the backup. In one or more embodiments, if a monitor process determines that the flag file for the backup already exists, the method proceeds to Step 216, where the monitor process making the determination ends, as there is already another monitor process for the backup, after which the method ends. In one or more embodiments, if the monitor process determines that no flag file yet exists, then the method proceeds to Step 218.

In Step 218, the monitor process creates the flag file for the backup. In one or more embodiments, creating the flag file includes generating a file and storing it in a predetermined location for storing a flag file in storage of a data source device. In one or more embodiments, the flag file includes, but is not limited to, the parent PID for the backup, and the child PID of the child process that, via the library instance, started the monitor process.

In one or more embodiments, some or all of Steps 206-218 are repeated each time a backup job is to be performed for the backup of the database. In this way, information for each backup job performed in the backup channel of each child process performing a backup either starts or identifies a single monitor process that will monitor all backup jobs of the backup. Thus, the monitor process will receive such information for each backup job of the database backup. The monitoring of a backup by the monitor process is discussed further in the description of FIG. 2B, below.

Figure 2B:
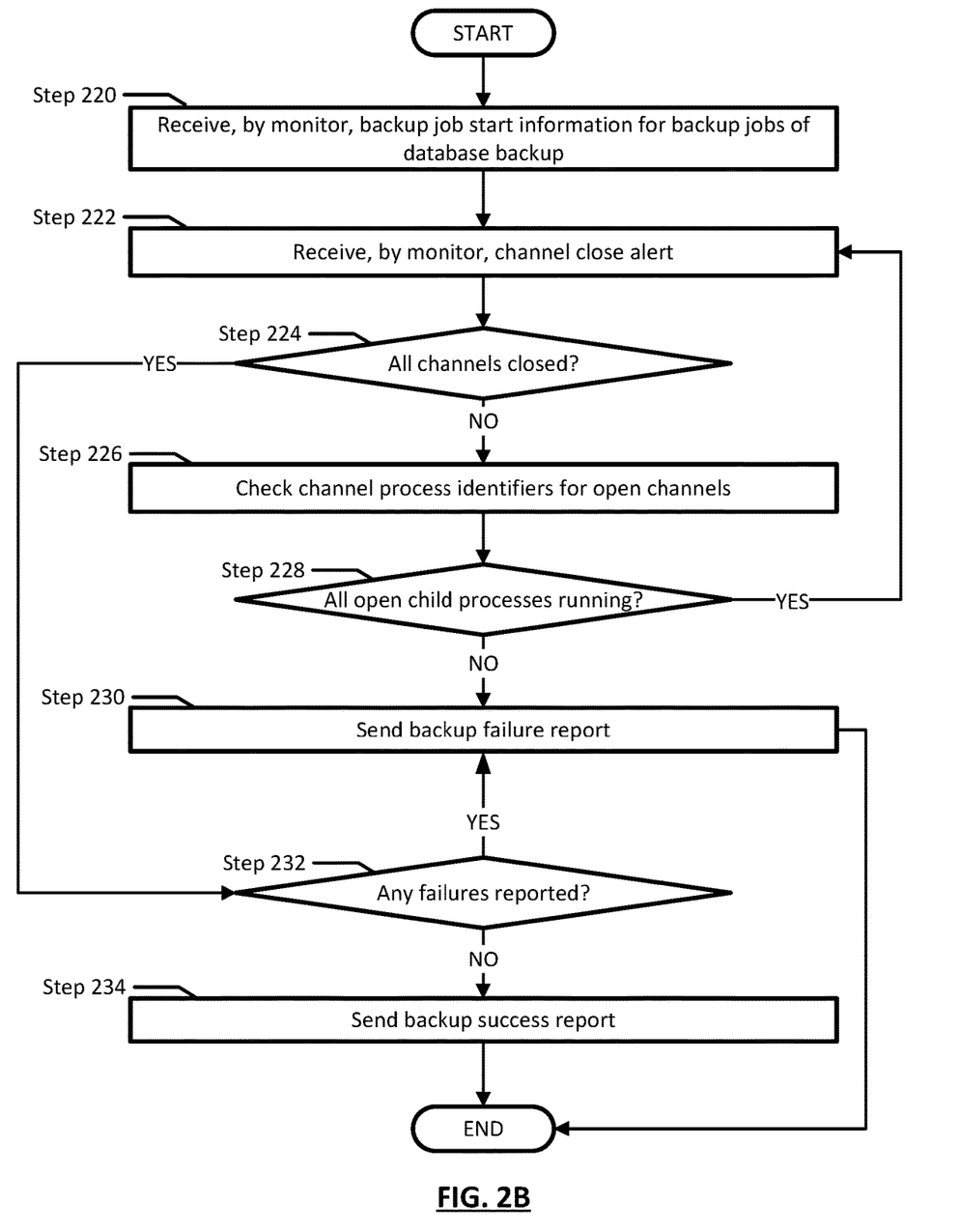
FIG. 2B shows a flowchart in accordance with one or more embodiments of the invention.

FIG. 2B shows a flowchart describing a method for monitoring a backup of a database by a monitor process in accordance with one or more embodiments disclosed herein.

While the various steps in the flowchart shown in FIG. 2B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 220, a monitor process that has been started for a backup of a database as shown in FIG. 2A receives backup start job information for a backup job of a database backup. In one or more embodiments, backup start information may include, but is not limited to, the name of the backup job, and a timestamp of when the backup job started. Backup job start information may include other items of information without departing from the scope of embodiments described herein.

In Step 222, the monitor process receives a channel close alert. In one or more embodiments, a channel close alert is sent to the monitor process by one of the child processes performing a portion of the backup of the database. In one or more embodiments, the channel close alert is an indication of that the channel of the child process, through which data of the database was being backed up via one or more backup jobs, is finished with the backup jobs that it is to perform, and thus is closing. In one or more embodiments, the closing of a channel of a child process means that no more backup jobs of the database backup will be performed using the channel.

In Step 224, a determination is made, by the monitor process, as to whether a channel close alert has been received from all child processes performing the database backup that the monitor process is monitoring. In one or more embodiments, if all channels have been reported as closed, the method proceeds to Step 232. In one or more embodiments, if a channel close alert has not been received for all channels, the method proceeds to Step 226.

In Step 226, the monitor process checks the PIDs for the channels for which a channel close alert has not been received. In one or more embodiments, the operating system maintains a list of PIDs and whether or not they are executing. In one or more embodiments, the monitor process queries against this list to determine if each child process from which a channel close alert has not yet been received is still executing.

In Step 228, a determination is made, based on the check of Step 226, whether all child processes that have not yet sent a channel close alert to the monitor process are still executing. In one or more embodiments, if all such child processes are still executing, the method returns to Step 222, and the monitor process waits for another channel close alert. In one or more embodiments, if the monitor process determines that at least one child process that has not yet sent a channel close alert is no longer executing, then that channel has failed, and the method proceeds to Step 230.

In Step 230, the monitor process, having determined that at least one child process failed before reporting the close of its channel, transmits a backup failure report to an operatively connected backup coordinator. In one or more embodiments, the failure report is transmitted over a network in any format that the backup coordinator is configured to receive and comprehend. In one or more embodiments, the failure report may include other information, including, but not limited to, the time at which the backup started, and the time at which the backup was determined to have failed.

In Step 232, based on the determination in Step 224 that all channels were reported by respective child processes performing the database backup to be closed, a further determination is made as to whether any of the backup jobs performed in any of the channels were reported as having failed for any reason. In one or more embodiments, if any backup job was reported to have failed for any reason, the method proceeds to Step 230, in which the failure of the database backup is reported as described above. In one or more embodiments, if the monitor process determines that all backup jobs of the database backup were reported to have succeeded, then the method proceeds to Step 234.

In Step 234, the monitor process sends a report to the backup coordinator indicating the backup was successful, along with other relevant information. Other information may include, but is not limited to, the time at which the backup started (e.g., when the first backup job of the database backup started), and the time the backup completed (e.g., the time the last channel closed).

Figure 2C:
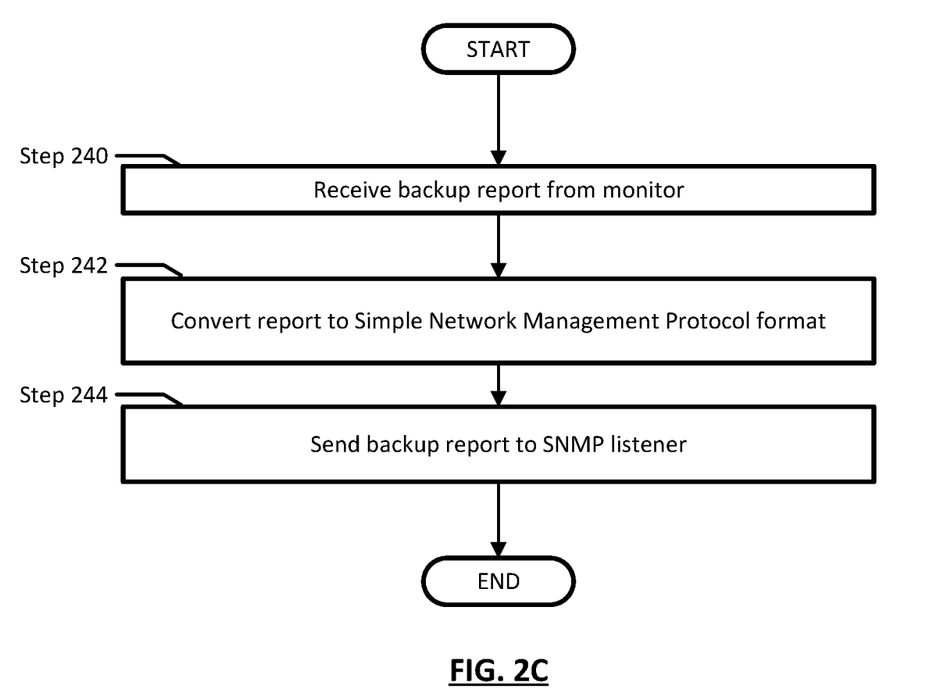
FIG. 2C shows a flowchart in accordance with one or more embodiments of the invention.

FIG. 2C shows a flowchart describing a method for reporting the status of a backup of a database in accordance with one or more embodiments disclosed herein.

While the various steps in the flowchart shown in FIG. 2C are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 240, a backup report is received. In one or more embodiments, the backup report is received at a backup coordinator. In one or more embodiments, the backup report is received from a monitor process executing on a data source device where the database for which the backup was attempted was stored. In one or more embodiments, the backup report includes whether the backup was a success or failure. In one or more embodiments, the report may include other information without departing from the scope of embodiments described herein. For example, the report may include a backup start time, end time, an identifier of the data source device, an identifier of the backup location, an identifier of the backup, etc.

In Step 242, the backup coordinator converts the report into a format appropriate for a SNMP trap message. In one or more embodiments, the format includes only fields that are defined for the SNMP format.

In Step 244, the backup coordinator transmits the SNMP trap message to an SNMP trap receiver, which may be referred to as a listener. In one or more embodiments, the SNMP trap message is sent over an operative connection between the backup coordinator and the SNMP trap receiver. For example, the SNMP trap message about the success or failure of the database backup may be transmitted over a network using any applicable network transmission protocol.

Example Scenario

The following describes an example in accordance with one or more embodiments described herein. The following example is for explanatory purposes only and not intended to limit the scope of embodiments described herein. Additionally, while the example describes certain aspects of embodiments described herein, all possible aspects of such embodiments may not be illustrated in this particular example. This example is intended to be a simple example to illustrate, at least in part, concepts described herein.

Consider a scenario in which an Oracle® database is executing on a server. When a database administrator wants to back up the database, the administrator accesses an RMAN client executing on the server where the database is stored. The user enters commands to select a secure backup type, and initiates the backup. The RMAN client then spawns three child processes to perform the backup, which is divided into nine backup jobs.

In this scenario, two of the child processes are started at nearly the same time, and the third is started a short time later. The first two child processes load a Dell EMC® library used for backing up Oracle databases to Dell EMC storage targets. Then the third child process also loads the library. The first child process provides a potential backup job name to the library, which sends the name to a Dell EMC NetWorker device. NetWorker performs a check and determines that the name is unique, and therefore sends the library an indication that the name is unique. The library instance of the second child process also sends a name of another backup job to NetWorker, and an indication again is returned that the name is unique.

At this point, the libraries of the first and second child processes check the storage of the server on which they are executing, and determine that no flag file exists yet for the database backup. Therefore they both start a monitor process. The monitor process started by the library instance of the first child process creates a flag file first, and includes in the flag file the parent PID of the child process, which is the RMAN PID. The second monitor process started by the library of the second child process checks to see if a flag file has been created for the backup that has the parent PID of the RMAN process, and determines that it does exist. Therefore, the second monitor process quits, and the second child process, via its library instance, will report backup information to the first monitor process that created the flag file.

Meanwhile, the third child process provides a name of a backup job to its library instance, and NetWorker indicates that the name is unique. The library instance then checks for the flag file, and finds that it already exists. Therefore, it does not start a monitor process, but instead will report backup information to the first monitor process that created the flag file.

Next, a backup job starts in the channel of each of the three child processes. The three library instances report the respective backup job names and start times, end times, and success statuses. Each child process performs three such backup jobs (for a total of nine). At the end of the third backup job in the first channel of the first child process, the monitor process receives a channel close alert from the first child process. The monitor process then checks the PIDs of the second and third child process, from which it has not received a channel close alert, and determines that they are still executing. When the third backup process in each of the second and third channel complete, the respective child processes send the monitor process channel close alerts. Having received channel close alerts from all channels of the backup, the monitor process checks and determines that all nine backup jobs were reported as successful. Therefore, the monitor process sends a backup report to NetWorker that includes that the backup was a success, the backup start time, the backup end time, and an identifier of the server from which the database was backed up. Networker then uses the report to format an SNMP trap, which is sent to an SNMP trap receiver over a network.

Figure 3:
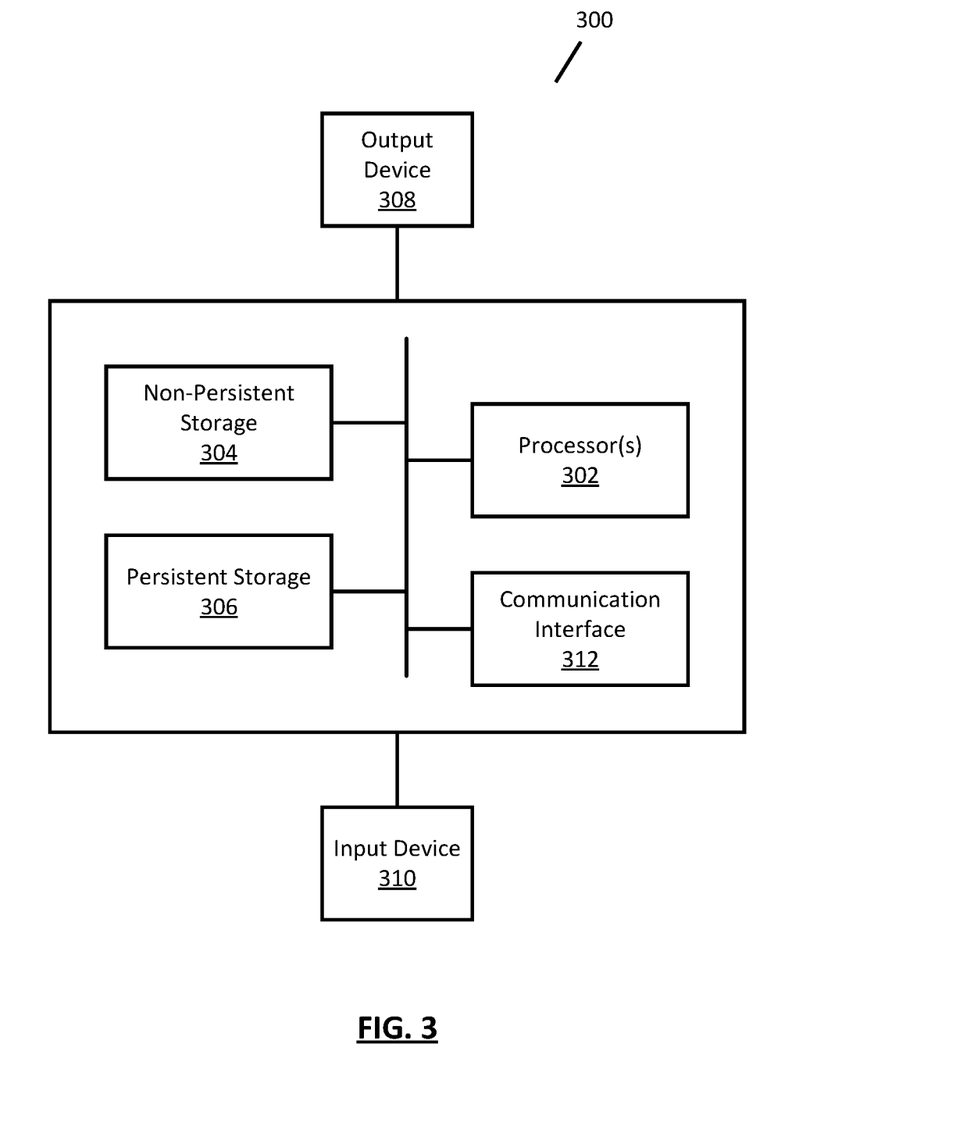
FIG. 3 shows a computing system in accordance with one or more embodiments of the invention.

As discussed above, embodiments of the invention may be implemented using computing devices. FIG. 3 shows a diagram of a computing device in accordance with one or more embodiments of the invention. The computing device (300) may include one or more computer processors (302), non-persistent storage (304) (e.g., volatile memory, such as random access memory (RAM), cache memory), persistent storage (306) (e.g., a hard disk, an optical drive such as a compact disc (CD) drive or digital versatile disc (DVD) drive, a flash memory, etc.), a communication interface (312) (e.g., Bluetooth® interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

Embodiments described herein address the problem of collating backup information from multiple backup channels for reporting the success or failure of a backup by using a single monitor process associated with the parent PID of the backup initiator (e.g., RMAN) that spawned the child processes having the backup channels in which the backup jobs of the backup are performed.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for reporting database backup information, the method comprising:
    making a first determination, by a first child process of a plurality of child processes, that a monitoring process associated with the plurality of child processes has not been started by determining that a flag file for the database has not been created by the plurality of child processes;
    starting, by a first library instance of the first child process executing on a data source device, the monitor process, wherein the first child process comprises a first backup channel for performing a first portion of a database backup of a database;
    making a second determination, by the first library instance, that the flag file has still not been created by the plurality of child processes, wherein the first child process is first in time of the plurality of child processes to start the monitor process;
    generating, by the monitor process, the flag file for the database backup comprising a parent process identifier (PID) of a parent process of the first child process, wherein the flag file:
        further comprises child (PIDs) associated with the plurality of child processes and backup job names associated with backup jobs of the database backup, and
        specifies backup job start times, backup job end times, backup job successes, backup job failures, and the first child process started the monitoring process and generated the flag file;
    associating a second child process of the plurality of child processes with the monitor process by identifying the flag file using the parent PID, wherein the second child process comprises a second backup channel for performing a second portion of the database backup;
    receiving, by the monitor process, a first channel close alert corresponding to the second channel from the second child process;
    performing, by the monitor process and using a PID of the first child process, a check to confirm that the first child process is still executing;
    receiving, by the monitor process and separate from the first channel close alert, a second channel close alert corresponding to the first channel from the first child process;
    making a third determination, by the monitor process, that a first plurality of the backup jobs performed in the first channel were successful;
    making a fourth determination, by the monitor process, that a second plurality of the backup jobs performed in the second channel were successful; and
    transmitting, by the monitor process and based on the first determination and the second determination, a backup success report to a backup coordinator,
    wherein the first backup channel and the second backup channel include separate data streams for transferring data from the database to a backup storage device.

2. The method of claim 1, further comprising, before receiving the first channel close alert and the second channel close alert:
    starting, by a second library instance of a third child process of the plurality of child processes executing on the data source device, a second monitor process;

making a fifth determination, by the second monitor process, that the flag file already exists by identifying the parent PID in the flag file; and stopping, based on the fifth determination, the second monitor process.

3. The method of claim 1, wherein the backup success report comprises a backup start time and a backup finish time.

4. The method of claim 1, wherein the backup coordinator converts the backup success report into a Simple Network Management Protocol (SNMP) trap, and transmits the SNMP trap to a SNMP trap receiver.

5. The method of claim 2, wherein, after the second monitor process is stopped, the third child process is associated with the monitor process.

6. The method of claim 2, wherein the first child process, the second child process, and the third child process have the same parent PID.

7. A non-transitory computer readable medium comprising computer readable program code, which when executed by a computer processor enables the computer processor to perform a method for reporting database backup information, the method comprising:

making a first determination, by a first child process of a plurality of child processes, that a monitoring process associated with the plurality of child processes has not been started by determining that a flag file for the database has not been created by the plurality of child processes;

starting, by a first library instance of the first child process executing on a data source device, the monitor process, wherein the first child process comprises a first backup channel for performing a first portion of a database backup of a database;

making a second determination, by the first library instance, that the flag file has still not been created by the plurality of child processes, wherein the first child process is first in time of the plurality of child processes to start the monitor process;

generating, by the monitor process, the flag file for the database backup comprising a parent process identifier (PID) of a parent process of the first child process, wherein the flag file:

further comprises child (PIDs) associated with the plurality of child processes and backup job names associated with backup jobs of the database backup, and specifies backup job start times, backup job end times, backup job successes, backup job failures, and the first child process started the monitoring process and generated the flag file;

associating a second child process of the plurality of child processes with the monitor process by identifying the flag file using the parent PID, wherein the second child process comprises a second backup channel for performing a second portion of the database backup;

receiving, by the monitor process, a first channel close alert corresponding to the second channel from the second child process;

performing, by the monitor process and using a PID of the first child process, a check to confirm that the first child process is still executing;

receiving, by the monitor process and separate from the first channel close alert, a second channel close alert corresponding to the first channel from the first child process;

making a third determination, by the monitor process, that a first plurality of the backup jobs performed in the first channel were successful;

making a fourth determination, by the monitor process, that a second plurality of the backup jobs performed in the second channel were successful; and transmitting, by the monitor process and based on the first determination and the second determination, a backup success report to a backup coordinator, wherein the first backup channel and the second backup channel include separate data streams for transferring data from the database to a backup storage device.

8. The non-transitory computer readable medium of claim 7, wherein the method performed by executing the computer readable program code further comprises, before receiving the first channel close alert and the second channel close alert:

starting, by a second library instance of a third child process of the plurality of child processes executing on the data source device, a second monitor process;

making a fifth determination, by the second monitor process, that the flag file already exists by identifying the parent PID in the flag file; and stopping, based on the fifth determination, the second monitor process.

9. The non-transitory computer readable medium of claim 7, wherein the backup success report comprises a backup start time and a backup finish time.

10. The non-transitory computer readable medium of claim 7, wherein the backup coordinator converts the backup success report into a Simple Network Management Protocol (SNMP) trap, and transmits the SNMP trap to a SNMP trap receiver.

11. The non-transitory computer readable medium of claim 8, wherein, after the second monitor process is stopped, the third child process is associated with the monitor process.

12. The non-transitory computer readable medium of claim 8, wherein the first child process, the second child process, and the third child process have the same parent PID.

13. A system for reporting database backup information, the system comprising:

a data source device operatively connected to a backup coordinator and comprising: a
processor;
memory;
a storage device;
a first library instance of a first child process of a plurality of child processes executing on the processor and comprising a first backup channel for performing a first portion of a database backup of a database, wherein the first library instance is configured to:

make a first determination that a monitoring process associated with the plurality of child processes has not been started by determining that a flag file for the database has not been created by the plurality of child processes;

in response to the first determination, start the monitor process; and the monitor process, executing on the processor, and configured to:

make a second determination that the flag file has still not been created by the plurality of child processes, wherein the first child process is first in time of the plurality of child processes to start the monitor process;

generate the flag file for the database backup comprising a parent process identifier (PID) of a parent process of the first child process, wherein the flag file:
  further comprises child (PIDs) associated with the plurality of child processes and backup job names associated with backup jobs of the database backup, and
  specifies backup job start times, backup job end times, backup job successes, backup job failures, and the first child process started the monitoring process and generated the flag file;

associate a second child process of the plurality of child processes with the monitor process by identifying the flag file using the parent PID, wherein the second child process comprises a second backup channel for performing a second portion of the database backup;

receive a first channel close alert corresponding to the second channel from the second child process;

performing, using a PID of the first child process, a check to confirm that the first child process is still executing;

receive, separate from the first channel close alert, a second channel close alert, corresponding to the first channel from the first child process;

make a third determination that a first plurality of the backup jobs performed in the first channel were successful;

make a fourth determination, by the monitor process, that a second plurality of the backup jobs performed in the second channel were successful; and transmit, based on the first determination and the second determination, a backup success report to the backup coordinator, wherein the first backup channel and the second backup channel include separate data streams for transferring data from the database to a backup storage device.

14. The system of claim 13, further comprising:
a second library instance of a third child process of the plurality of child processes executing on the processor, and configured to, before receiving the first channel close alert and the second channel close alert, starting a second monitor process; and
the second monitor process configured to:
  make a fifth determination that the flag file already exists by identifying the parent PID in the flag file; and
  stop, based on the fifth determination, execution of the second monitor process.

15. The system of claim 13, wherein the backup success report comprises a backup start time and a backup finish time.

16. The system of claim 14, wherein, after the second monitor process is stopped, the third child process is associated with the monitor process.

17. The system of claim 14, wherein the first child process, the second child process, and the third child process have the same parent PID.

\* \* \* \* \*